Figure 1:
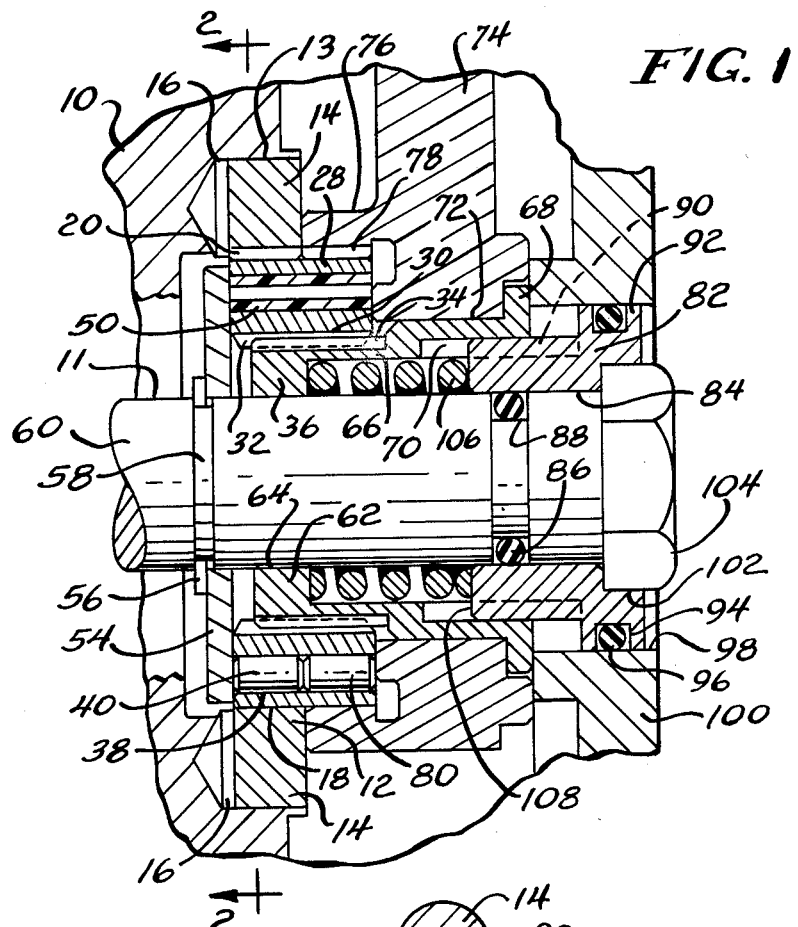

United States Patent [19]

Nelson et al.

[11] Patent Number: 4,788,874
[45] Date of Patent: Dec. 6, 1988

[54] DIFFERENTIAL CLUTCH

[76] Inventors: Bertel S. Nelson, 27 W 742 North La., Naperville, Ill. 60540; William R. Danforth, deceased, late of Yorkville, Ill., Danforth, executor; by Nelson

[21] Appl. No.: 11,525
[22] Filed: Feb. 6, 1987
[51] Int. Cl.⁴ .................. G05G 1/00; F16D 67/02
[52] U.S. Cl. .................... 74/142; 74/577 R; 192/12 B; 192/15; 192/41 A
[58] Field of Search .......... 74/142, 154, 152, 577 R, 74/577 S, 577 SF, 577 M, 625; 192/2 R, 12 B, 15, 46, 41 A

[56] References Cited

U.S. PATENT DOCUMENTS

| | | | |
|---|---|---|---|
| 1,222,712 | 4/1917 | Armstrong | 192/12 B |
| 1,985,406 | 12/1934 | Galkin | 192/12 B |
| 2,129,566 | 9/1938 | Curtis | 74/577 M |
| 2,217,183 | 10/1940 | Ross | 192/12 B |
| 4,085,629 | 4/1978 | Fogarollo | 74/625 |
| 4,352,710 | 10/1982 | Makley | 192/46 |

FOREIGN PATENT DOCUMENTS 186675 12/1963 Sweden ..................... 74/577

Primary Examiner—Lawrence Staab
Attorney, Agent, or Firm—Robert M. Wolters

[57] ABSTRACT

A differential clutch comprises a driving member having a plurality of inner circumferentially disposed clutch teeth cooperating with a lesser number of sprags resiliently urged outwardly on an intermediate member. A second set of sprags on the intermediate member cooperates with clutch teeth on a fixed member to prevent retrograde movement. Rocking back and forth of the turnable member acts through the clutch teeth and sprags to turn the intermediate member. The intermediate member is connected to a driven member, for example, for adjusting a brake, or for acting as a part of a ratchet wrench.

1 Claim, 1 Drawing Sheet

DIFFERENTIAL CLUTCH

BACKGROUND OF THE INVENTION

A need exists for frequent adjustment of brakes in motor vehicles, particularly trucks. Efforts have been made to effect automatic adjustment whenever a brake is applied. A lever is operated whenever a brake is applied, and means must be provided so that the lever effects tightening adjustment when moved in one direction, and holds parts in place without movement upon return of the lever to its normal or rest position.

The drive or force transmission from the lever to the tightening mechanism must be positive in the desired tightening direction and capable of transmitting substantial force. Similar requirements pertain for other devices, such as ratchet wrenches.

OBJECT AND SUMMARY OF THE PRESENT INVENTION

It is an object of the present invention to provide a differential clutch having a positive operation and operable with relatively little rotational movement of the driving member.

In accordance with the present invention a rotary oscillating member is rocked or pivoted back and forth by an operating member, such as a lever. The oscillating member is provided on its inner periphery with a plurality of clutch teeth. A plurality of sprag levers is mounted on an intermediate member, and the sprag levers are resiliently urged into engagement with the clutch teeth. When the oscillating member pivots in one direction, it engages the ends of the sprag levers to turn the intermediate member When the oscillating member moves in the other direction, the clutch teeth simply ratchet over the ends of the sprag levers. The intermediate member is in turn coupled by an additional plurality of sprag levers to a fixed member having internal clutch teeth to prevent the intermediate member from retrograde movement when it is not being advanced The intermediate lever member is splined to a coupling member, and the coupling member is in turn splined to a turning member for connection to an adjusting shaft.

THE DRAWINGS

Figure 2:
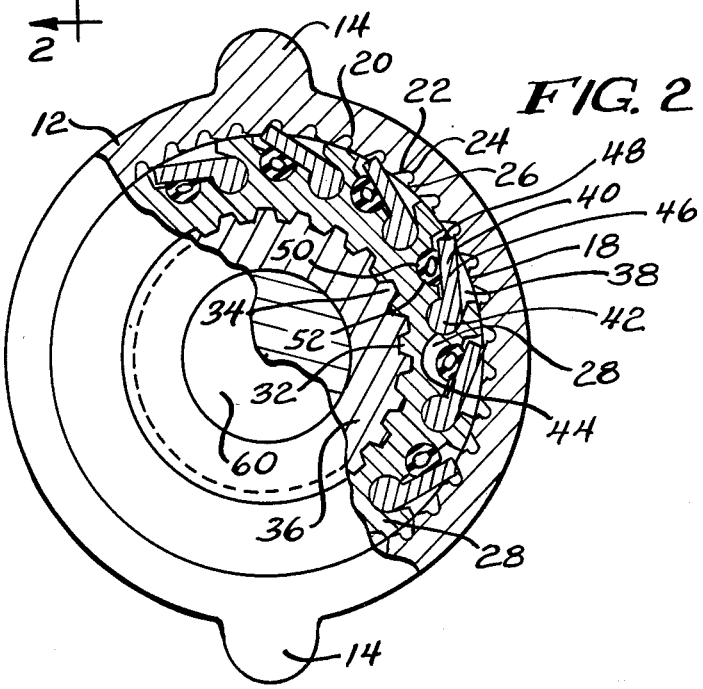

The present invention will best be understood with reference to the following specification when taken in connection with the accompanying drawings wherein:

FIG. 1 is a fragmentary axial sectional view taken through a differential clutch constructed in accordance with the principles of the present invention; and FIG. 2 is a cross-sectional view taken substantially along the lines 2—2 in FIG. 1.

DETAILED DISCLOSURE OF THE ILLUSTRATED EMBODIMENT

A fixed base member 10, which may, for example, comprise a part of the brake housing of a motor truck is provided with a central opening or bore 11. A fixed clutch member 12 is received in a recess 13 in the fixed base member 10, and the fixed clutch member 12 is provided with a pair of diametrically opposed, radially extending ears 14 which are received in recesses 16 of the base member in order to mount the fixed clutch member 12 to said fixed base member in such manner that it cannot rotate. The fixed clutch member 12 has an inner periphery of arcuate form having a succession of clutch teeth 20 formed therein. The clutch teeth are shaped so as to have a relatively flat sprag-engaging surface 22 joined by an arcuate portion 24 to a tapered surface 26.

An annular intermediate clutch member 28 has a bore 30 which is splined at 32, the splines cooperating with splines 34 on an elongated, annular transfer member 36.

The outer periphery of the intermediate clutch member 28 is provided with a plurality of shaped recesses 38 in which sprag levers 40 are respectively mounted. The sprags or sprag levers 40 include enlarged, cylindrical inner ends 42 received in similarly shaped portions 44 of the recesses 38. The sprags also include tangential lever arms 46 having transverse, squared off ends 48 engageable with the flat surfaces 22 of the clutch teeth 20. The arms 46 are urged radially outwardly of the intermediate member 28 by resilient members, such as sections of synthetic rubber tubing 50 received in generally cylindrical recesses 52 opening into the recesses 38 in which the sprags are mounted. The rubber tubular members 50 resiliently bear against the undersides of the arms 46 to urge them substantially radially outwardly, whereby to engage in the clutch teeth 20 as hereinafter described. It will be understood that suitable metallic springs could be used instead of the tubular rubber sections.

The tubular rubber sections and the sprags 40 are restrained against outward movement axially of the intermediate clutch member 28 by means of a flat washer 54 held in place axially by a resilient ring or C-washer 56 received in an annular recess 58 in an adjusting shaft 60 which extends to the brake adjustment (not shown).

The annular transfer member 36 includes a transverse portion 62 having a central bore 64 receiving the shaft 60. The outer portion of the transverse wall 62 is provided with an axially extending cylinder 66, and the splines 34 are formed on this cylinder and on the transverse wall 36. The transfer member is provided with an annular flange 68 at the end remote from the transverse wall 36, and is provided with internal splines 70.

A portion of the cylinder 66 is provided with a smooth outer cylindrical surface 72 on which a lever 74 is rockable. The lever is provided on one axial surface (the left surface in FIG. 1) with a cylindrical boss 76 having internal clutch teeth 78 similar to the clutch teeth 20. A second annular array of sprags 80 is carried by the intermediate clutch member 28 in the same manner as the sprags 40, and the same tubular, resilient rubber members 50 urge the sprags 80 radially outwardly in the same manner as they urge the sprags 40. A generally cylindrical turning member 82 has an inner bore 84 encircling the shaft 60 and sealed thereto by a rubber or the like O-ring 86 received in an annular groove 88 in the shaft 60 relatively adjacent to the outer end thereof. The cylindrical member 82 is provided with external splines 90 interfitting with the splines 70 to couple the cylindrical member 82 to the transfer member 36. At its right or outer end, the cylindrical member 82 is provided with a radially outwardly extending flange 92 having an annular groove 94 in which there is mounted a rubber or the like O-ring 96 for sealing the member 82 in a bore 98 in a housing member 100.

The housing member is provided with a relatively shallow hexagonal socket 102 which receives a hexagonal head 104 on the shaft 60. The head extends outwardly (to the right in FIG. 1) of the flange 92 of the cylindrical member 82. A helical spring 106 is received within the cylinder 66, being compressed between the wall 36 and the end 108 of the cylindrical member 82. This holds the cylindrical member 82 axially outwardly to engage the hexagonal head 104 within the hexagonal socket 102. When it is desired to make manual adjustment of the brake adjusting shaft 60, it is only necessary to press the end of a socket or other wrench against the outer end surface of the flange 92 and about the head 104 to depress the cylinder 82 against the spring 106, and thereby to free the head 104 from the socket 102 for rotary adjustment of the shaft 60.

The number of sprags 80 is equal to the number of sprags 40, while the clutch teeth 78 are equal in number to the clutch teeth 20. There are more clutch teeth than there are sprags, and for example, there might be 12 sprags and 39 clutch teeth presenting a ratio of 12:39. Reducing this to a common denominator of 4:13 requires division by a common divisor of 3. This is the number of sprags and teeth engaged at any one time. Rotation of the intermediate clutch member 28 comprises these factors multiplied together, namely 4, 13×3, and this produces a rotation ratio of 156:1. That is, the lever 74 must have a total increment of 156 degrees of rotation or oscillation to produce one degree of turning of the intermediate member 28, and hence of the shaft 60.

Turning of the intermediate member is effected by engagement of the sprags 80 with the clutch teeth 78 upon rotation of the lever 74 in a given direction (clockwise in FIG. 2), while the sprags 40 and clutch teeth 20 in the fixed member 12 prevent retrograde rotation of the intermediate member 28 when the lever rocks back to its initial position. Note that the sprag arms are eccentric relative to the sprag pivot centers whereby driving engagement of the clutch teeth with the sprags forces the tips of the sprag arms outwardly into firmer engagement with the clutch teeth.

Other numbers of teeth and sprags can be used to present different increments of rotation as the lever rocks back and forth. There is always a plurality of sprags in engagement with the corresponding teeth, whereby considerable strength is provided to the differential clutch.

The specific example of the invention as herein shown and described will be understood as being for illustrative purposes only. Various changes in structure will no doubt occur to those skilled in the art, and will be understood as forming a part of the present invention insofar as they fall within the spirit and scope of the appended claim.

The invention is claimed as follows:

1. A differential clutch for incremental movement of a turnable member in a given direction, comprising in combination with a driven turnable member and a driving member pivotable in a back-and-forth oscillating manner, an annular member connected to said driving member for pivoting therewith, said annular member having a plurality of arcuately disposed clutch teeth, an annular intermediate clutch member, a first set of sprags including a predetermined plurality of sprags on said intermediate member, means resiliently urging said sprags radially into engagement with said clutch teeth, said sprags being substantially less in number than said clutch teeth, said clutch teeth and said sprags turning said intermediate member in one direction upon pivoting of said driving member in one direction but not turning said intermediate member upon pivoting of said driving member in said opposite direction, means acting on said intermediate member to prevent retrograde movement upon pivoting of said driving member in said opposite direction, and means connecting said intermediate member to said turnable member for turning of said turnable member with said intermediate member, said means for preventing retrograde movement of said intermediate member comprising a fixed member having a second set of clutch teeth, a second set of sprags on said intermediate member and comprising a second plurality of sprags equal in number to said predetermined plurality, and means resiliently urging said second set of sprags into engagement with said second set of clutch teeth, each of said sprags including a pivot portion and an arm extending tangentially from said pivot portion, whereby longitudinal thrust from said clutch teeth on said sprag arms augments the force resiliently urging the sprags and clutch teeth into engagement, the pivot portion of each sprag comprising a cylindrical portion, said intermediate member having a plurality of cylindrical recesses respectively receiving said cylindrical portions of both sets of said sprags, said first and said second resilient means comprising a plurality of resilient members equal in number to said predetermined plurality and each thereof resiliently biassing one of said first set of sprags and a respective one of said second set of sprags.

* * * * *